US012570196B2

(12) United States Patent
Haley et al.

(10) Patent No.: US 12,570,196 B2
(45) Date of Patent: Mar. 10, 2026

(54) WIRELESS POWER TRANSMISSION FROM A HEADREST

(71) Applicant: FCA US LLC, Auburn Hills, MI (US)

(72) Inventors: John W Haley, Rochester, MI (US); Frank Jordan, Ruesselsheim (DE)

(73) Assignee: FCA US LLC, Auburn Hills, MI (US)

( * ) Notice: Subject to any disclaimer, the term of this patent is extended or adjusted under 35 U.S.C. 154(b) by 174 days.

(21) Appl. No.: 18/526,292

(22) Filed: Dec. 1, 2023

(65) Prior Publication Data

US 2025/0178504 A1 Jun. 5, 2025

(51) Int. Cl.
| | |
|---|---|
| *B60N 2/879* | (2018.01) |
| *H02J 50/00* | (2016.01) |
| *H02J 50/10* | (2016.01) |
| *H02J 50/20* | (2016.01) |
| *H02J 50/30* | (2016.01) |

(52) U.S. Cl.
CPC ............ *B60N 2/879* (2018.02); *H02J 50/005* (2020.01); *H02J 50/10* (2016.02); *H02J 50/20* (2016.02); *H02J 50/30* (2016.02); *B60N 2230/30* (2023.08)

(58) Field of Classification Search
CPC .... B60N 2/879; B60N 2/80; B60N 2002/899; B60N 2002/905; B60N 2230/30; H02J 50/10; H02J 50/20; H02J 50/30; H02J 50/005
See application file for complete search history.

(56) References Cited

U.S. PATENT DOCUMENTS

| | | | | |
|---|---|---|---|---|
| 9,998,818 B1 * | 6/2018 | Mitchell | ................ | B60N 2/879 |
| 10,717,378 B2 * | 7/2020 | Durkee | ................ | B60N 2/809 |
| 2014/0152057 A1 * | 6/2014 | Truant | ................ | B60N 2/879 |
| | | | | 297/180.12 |
| 2015/0130408 A1 * | 5/2015 | Wei | ................ | H02J 50/10 |
| | | | | 320/108 |

FOREIGN PATENT DOCUMENTS

CN         208682687 U   *   4/2019

OTHER PUBLICATIONS

Meta Quest Pro; https://vr-compare.com/headset/metaquestpro; (1 page).
Xreal Air and Xreal Beam review: impressive AR tech but still not perfect; https://www.techradar.com/reviews/nreal-air-ar-glasses; (1 page).
Kim, Yong Min, et al.; Wearing Comfort and Percevied Heaviness of Smart Glasses; Mar. 3, 2021 (12 pages).

(Continued)

*Primary Examiner* — Milton Nelson, Jr.
(74) *Attorney, Agent, or Firm* — Jeremy J. Klobucar

(57) ABSTRACT
In at least some implementations, the vehicle headrest assembly comprises a body with an exterior defined by an outer surface and an interior. The body includes a mount by which the body is mountable on a vehicle seat. The vehicle headrest assembly includes a power cable at least partially within the interior that is adapted to communicate with a power supply. A transmitter is carried by the body and electrically communicated with the power cable to provide a wireless power transmission. And a switch is in electrical communication with the transmitter to selectively permit transmission from the transmitter.

17 Claims, 1 Drawing Sheet

(56) References Cited

OTHER PUBLICATIONS

VUZIX; https://www.vuzix.com; 2023 (1 page).
Screenshot for EyeRide Head up Display for Riders; https://www.youtube.com/watch?v=b_8BSqs1xXw; Accessed Nov. 30, 2023.
Screenshot for HoloLens2; https://www.youtube.com/watch?v=XwOnHqiNAeU; Accessed Nov. 30, 2023.
Screenshot for HoloLens2 AR Headset on Stage Live Demonstration; https://www.youtube.com/watch?v=ulHPPtPBgHk; Accessed Nov. 30, 2023.

* cited by examiner

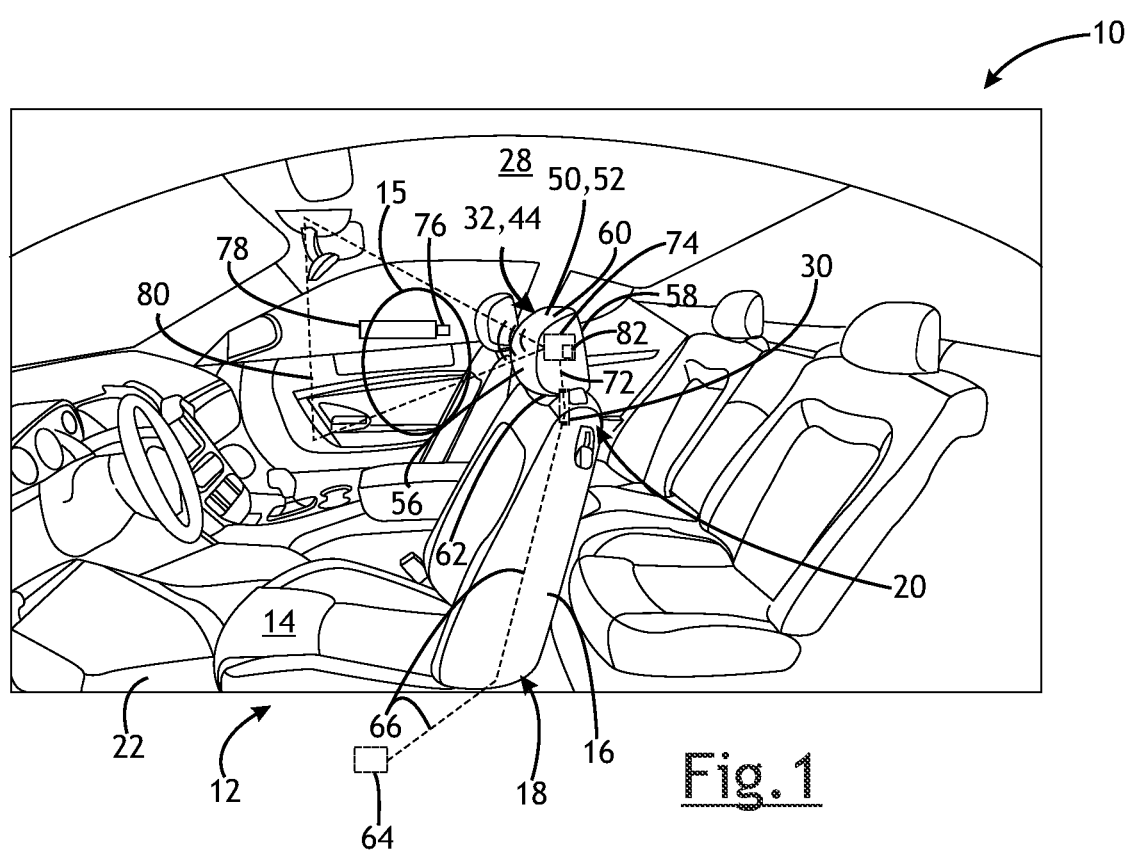
_Fig.1_
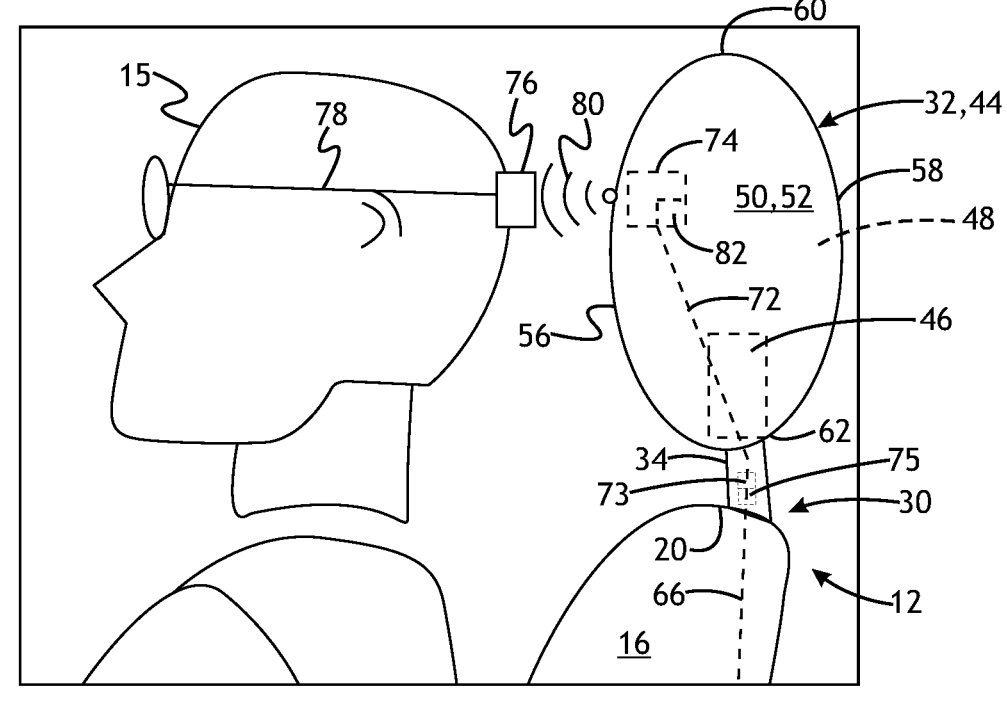
_Fig.2_

WIRELESS POWER TRANSMISSION FROM A HEADREST

FIELD

The present disclosure relates to wireless power transmission from a vehicle headrest to, for example, charge or power electronic devices.

BACKGROUND

Vehicle headrests are used to limit rearward head movement of a vehicle occupant during a collision, particularly at the rear end of the vehicle. Additionally, wearable electronics traditionally must be charged while removed from the user. This requires wearable electronic devices to have bulky and heavy batteries capable of storing energy to support long duration operation of the wearable electronic device, leading to unappealing and uncomfortable designs to accommodate these batteries.

SUMMARY

In at least some implementations, the vehicle headrest assembly comprises a body with an exterior defined by an outer surface and an interior. The body includes a mount by which the body is mountable on a vehicle seat. The vehicle headrest assembly includes a power cable at least partially within the interior that is adapted to communicate with a power supply. A transmitter is carried by the body and electrically communicated with the power cable to provide a wireless power transmission. And a switch is in electrical communication with the transmitter to selectively permit transmission from the transmitter.

In at least some implementations, the transmitter emits radio waves at a frequency capable of inducing an electric potential in a device within a field of transmission. In at least some implementations, the transmitter emits a magnetic field capable of inducing electric potential in the device within a field of transmission. In at least some implementations, the transmitter emits a charging beam capable of inducing an electric potential in the device within a field of transmission.

In at least some implementations, the mount includes a post by which the body is connectable to a vehicle seat wherein at least part of the power cable is received within the post. In at least some implementations, the mount includes a post by which the body is connectable to a vehicle seat wherein at least part of the power cable is received within the post and the transmitter emits radio waves at a frequency capable of inducing an electric potential in the device within a field of transmission, or the transmitter emits a magnetic field capable of inducing an electric potential in the device within a field of transmission, or the transmitter emits a charging beam capable of inducing an electric potential in the device within a field of transmission.

In at least some implementations, the transmitter is a transceiver capable of receiving information from a device.

In at least some implementations, the assembly includes a receiver capable of receiving a transmission from a device at least when the device is within a field of transmission of the transmitter. In at least some implementations, the switch is responsive to a signal from the receiver indicating that the device is within the field of transmission.

In at least some implementations, a vehicle seat assembly includes a headrest with a body having an exterior defined by an outer surface, and an interior and a first mount. The assembly includes a vehicle seat with a second mount coupled to the first mount, a source cable routed through at least part of a vehicle seat, a power cable at least partially within the interior and coupled to the source cable, a transmitter carried by the headrest coupled to the power cable, and adapted to wirelessly transmit electrical power, and a switch. The switch is in electrical communication with the transmitter to selectively permit transmission from the transmitter.

In at least some implementations, one of the first mount and the second mount includes an opening, and the other of the first mount and the second mount includes a post at least partially received within the opening, and one or both of the source cable and the power cable extend at least partially through the first mount or the second mount.

In at least some implementations, the transmitter emits radio waves at a frequency, a magnetic field, or a charging beam capable of inducing an electric potential in the device within a field of transmission.

In at least some implementations, a receiver is provided that is capable of receiving a transmission from a device at least when the device is within a field of transmission of the transmitter. In at least some implementations, the switch is responsive to a signal from the receiver indicating that the device is within the field of transmission.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 1 is a perspective view of a passenger compartment of a vehicle;

FIG. 2 is a diagrammatic view showing a headrest with a wireless power transmitter to an electronic device worn on the head of a vehicle occupant.

DETAILED DESCRIPTION

Referring in more detail to the drawings, FIG. 1 shows an interior of a vehicle including a passenger compartment 10 having one or more seats 12. The seats 12 include a seat bottom 14 on which an occupant 15 sits, and a seat back 16 that extends vertically from a lower end 18 adjacent to the seat bottom 14 to an opposite upper end 20. The seat bottom 14 is mounted to the floor 22 of the passenger compartment 10 and has at least a top surface and back surface, wherein the top surface faces the roof 28 of the passenger compartment 10 and the back surface faces towards the rear of the passenger compartment 10. Both the interior of the seat bottom 14 and the interior of the seat back 16 may be configured to at least partially house a support structure, cushions, and wires or cables for seat adjustment, seat heating or seat cooling devices. The seat back 16 may be pivotably mounted relative to the seat bottom 14. The seat back 16 includes a headrest mounting structure 30 by which a headrest 32 is mounted to the seat back 16. In at least some implementations, the headrest mounting structure 30 may include one or more openings configured to interact with a mount 34 of the headrest 32 that is coupled to the upper end 20 of the seat back 16.

The mount 34 may extend from the headrest 32 and is configured to be coupled to the headrest mounting structure 30. The mount 34 may include one or more posts 34 configured to interact with the one or more openings of the headrest mounting structure 30. The mount 34 and headrest mounting structure 30 are complimentary such that the posts of one may be received in a like number of openings of the other. In at least some implementations, the mount 34 can be vertically adjusted to change the distance of the headrest 32 from the seat back 16.

The headrest 32 has a body 44 with an exterior and an interior, and as shown in FIG. 2, the body 44 may have a support structure 46 that may be integral to the mount 34 such that the mount 34 and the support structure 46 are one piece, or the support structure and the mount 34 may be separate pieces coupled together. A cushion 48 (FIG. 2) comprising a foam or soft polymeric material may be mounted to or carried by the support structure, including a forward-facing portion between the support structure and a front surface of the headrest 32. The cushion may be partially or entirely enclosed by a cover 50 made of a fabric, cloth, leather, vinyl or similar material such that the cushion is oriented between the cover 50 and the support structure. The cover 50 has an outer surface 52 defining the exterior of the body 44 and an inner surface defining the interior of the body 44 such that the cushion and at least part of the support structure are within the interior of the headrest 32. The exterior of the headrest 32 includes: a forward surface 56 that faces the front of the passenger compartment 10 and the head of an occupant 15 in the seat 12; a rearward surface 58 that faces towards the rear of the passenger compartment 10, opposite to the forward surface 56; an upper surface 60; and a bottom surface 62 that are vertically spaced apart such that the upper surface 60 faces the roof 28 of the passenger compartment 10 and the bottom surface 62 faces the upper end 20 of the seat back 16.

The vehicle includes a power supply 64 that serves as an electrical energy source for accessories or devices. The power supply 64 may be a battery, power generator such as an alternator or regenerative braking system, or other forms of energy storage and generation. The power supply 64 may include components located at various positions throughout the vehicle or passenger compartment 10 and capable of transmitting electrical power through conductors (e.g. wires) to locations throughout the vehicle or passenger compartment 10.

A source cable 66 may be connected to the power supply 64 at a first end and extend to a second end, opposite to the first end. The source cable 66 includes a conductor (e.g. copper wire) capable of conducting electrical current from one location to another. The source cable 66 is configured to connect to and provide power to a headrest power assembly. In the embodiments shown in FIGS. 1 and 2, the source cable 66 originates at a tap or connection of the power supply 64 located in or adjacent to the floor 22 of the passenger compartment 10. From the power supply 64, the source cable 66 is routed through the interior of the seat bottom 14 and the interior of the seat back 16 to the headrest mounting structure 30.

The headrest power assembly includes a power cable 72 that is located at least partially within the interior of the headrest 32, is adapted to communicate with a power supply 64, and is connected at a first end by a connector 73 coupled to a mating connector 75 at the second end of the source cable 66. In at least some implementations, at or near the headrest mounting structure 30, the source cable 66 connects to the power cable 72 such that at least a portion of either the source cable 66 or the power cable 72 extends through the headrest mounting structure 30 and, for example, through a post or opening of the mount 34.

To provide power to an electronic device 78 located outside the headrest 32, the power cable 72 is connected at a second end to a power transmitter 74 that is capable of wirelessly transmitting power to be received by a receiver 76 of the electronic device 78. The transmitter 74 is carried by the headrest (e.g. by body 44 or mount 34) may be mounted on the outer surface 52 or within the interior of the headrest 32. As shown in FIGS. 1 and 2, the transmitter 74 is oriented such that a field of transmission 80 is emitted from the forward surface 56 of the headrest 32 and towards the front of the passenger compartment 10. In other embodiments, it is possible to orient the transmitter 74 such that the field of transmission 80 is emitted in other directions. For example, the field of transmission 80 may be emitted from the rearward surface 58 of the headrest 32 to transmit power to the electronic device 78 when the electronic device 78 is located behind the seat 12.

As shown in FIG. 2, a switch 82 is in electrical communication with the transmitter 74 to selectively permit electrical power transmission from the transmitter 74. The switch 82 may be positioned between the power supply 64 and the transmitter 74 such as to selectively control the flow of electricity between the power supply 64 and the transmitter 74. In the embodiment depicted in FIG. 2, the switch 82 is located at the transmitter 74 to selectively control the transmission of power from the transmitter 74 to the device 78. In at least some embodiments, the switch 82 may be controlled by a physical button within the passenger compartment 10 or a digital selection within a digital user interface such that an occupant 15 can selectively control the transmission of power from the transmitter 74 manually.

In other embodiments, the transmitter 74 may be a transceiver such that the transmitter 74 is capable of both transmitting power to and receiving, via a receiver, information or other transmission from the device 78. The transmitter 74 may wirelessly communicate with the device 78 to receive information from the device including but not limited to battery charge level, distance from the transmitter 74, and other device information such as the model and manufacturer of the device 78. This information may be used to detect if the device 78 is within a suitable range of the transmitter 74 such that the device 78 is capable of receiving power from the transmitter 74. Furthermore, if the transmitter 74 detects that the device 78 is within the field of transmission 80, or that the device 78 has low battery charge, the switch 82 may change state to allow power transmission from the transmitter 78. Conversely, if the device 78 has high battery charge level, or the device 78 is not within the field of transmission 80, the switch 82 may automatically interrupt power transmission until the battery condition of the device 78 changes and/or the location of the device 78 changes to be within the field of transmission 80. Thus, the switch 82 or a controller coupled to the switch may be responsive to a signal from the receiver indicating that the device is within the field of transmission, and in response, the switch 82 may be controlled or may change state to permit power transmission from the transmitter 74.

To transmit power to the device 78, the transmitter 74 may be an induction charger consisting of a coil capable of inducing an electric potential in a receiver 76 of the device consisting of an antenna or coil. The induction charger is capable of inducing an electric potential within the field of transmission 80 such that when the device 78 is located within the field of transmission 80, power is transmitted wirelessly from the transmitter 74 to a receiver 76 of the device 78. In other embodiments, the transmitter 74 may be a radio transmitter that emits radio waves at a frequency capable of inducing an electric potential in a device 78 within a field of transmission 80. The device 78 having a receiver 76 capable of receiving power from the radio waves emitted by the transmitter 74. In other embodiments, the transmitter 74 may be a laser capable of emitting a charging beam to induce an electric potential in the device 78 within the field of transmission 80. In this implementation, the device 78 may include a photovoltaic cell or a thermoelectric generator to convert energy from the charging beam into electric potential to charge a battery of the device or to power the device itself. Other methods of wirelessly transmitting energy known in the art may be used to facilitate the transfer of energy from the transmitter 74 to the device 78.

In at least some implementations, the electronic device 78 is worn on or near the head of a vehicle occupant 15 located in the seat 12, and power is transmitted via the headrest power assembly to the electronic device 78. The electronic device 78 may include audio and/or video features, such as headphones or electronic glasses having a frame and lenses on which information may be projected or otherwise displayed. Such glasses are sometimes called smart glasses, virtual reality glasses or enhanced or augmented reality glasses. Such glasses may be used to provide information to a driver of the vehicle, such as current speed, fuel level, navigation route or instructions, alerts, and the like.

By providing electrical power to the electronic device 78 from the vehicle, a battery or other power storage device of the device 78 can be made smaller and lighter weight. This enables reduction in the size and/or the weight of the device 78 and can improve user comfort, especially when the device 78 is worn for longer periods of time. The transmitter 74 can permit a desired range of motion of the device 78 relative to the headrest 32, and the field of transmission 80 facilitates automatic decoupling of the interaction between the device 78 and the transmitter 74 once the device 78 leaves the field of transmission 80. Further, the transmitter 74 facilitates easy coupling and decoupling of the device 78 to the vehicle power supply 64, without the need for a physical connection that can wear out and which might not disconnect easily/automatically as a user moves the device 78 beyond the intended area of use or beyond the passenger compartment 10.

What is claimed is:

1. A vehicle headrest assembly, comprising:
a body with an exterior defined by an outer surface and an interior, and a mount by which the body is mountable on a vehicle seat;
a power cable at least partially within the interior, adapted to communicate with a power supply;
a transmitter carried by the body and electrically communicated with the power cable to provide a wireless power transmission;
a receiver capable of receiving a wireless transmission from a device at least when the device is within a field of transmission of the transmitter; and
a switch in electrical communication with the transmitter to selectively permit transmission from the transmitter, wherein the switch is responsive to the wireless transmission received by the receiver indicating that the device is within the field of transmission such that the switch changes state to permit the transmitter to provide the wireless power transmission adapted to charge a battery of the device.

2. The assembly of claim 1 wherein the transmitter emits radio waves at a frequency capable of inducing an electric potential in a device within a field of transmission.

3. The assembly of claim 1 wherein the transmitter emits a magnetic field capable of inducing an electric potential in a device within a field of transmission.

4. The assembly of claim 1 wherein the transmitter emits a charging beam capable of inducing an electric potential in a device within a field of transmission.

5. The assembly of claim 1 wherein the mount includes a post by which the body is connectable to a vehicle seat wherein at least part of the power cable is received within the post.

6. The assembly of claim 5 wherein the transmitter emits radio waves at a frequency capable of inducing an electric potential in a device within a field of transmission.

7. The assembly of claim 5 wherein the transmitter emits a magnetic field capable of inducing an electric potential in a device within a field of transmission.

8. The assembly of claim 5 wherein the transmitter emits a charging beam capable of inducing an electric potential in a device within a field of transmission.

9. The assembly of claim 1 wherein the transmitter is a transceiver capable of receiving information from a device.

10. The assembly of claim 9 wherein the transmitter emits radio waves at a frequency capable of inducing an electric potential in the device within a field of transmission.

11. The assembly of claim 9 wherein the transmitter emits a magnetic field capable of inducing an electric potential in the device within a field of transmission.

12. The assembly of claim 9 wherein the transmitter emits a charging beam capable of inducing an electric potential in the device within a field of transmission.

13. The assembly of claim 1 wherein the switch is responsive to a signal from the receiver indicating that the device is within the field of transmission and wherein the switch is in a state that prevents the transmitter from providing the wireless power transmission when the device is not indicated to be within the field of transmission.

14. A vehicle seat assembly, comprising:
a headrest with a body having an exterior defined by an outer surface, and an interior and a first mount;
a vehicle seat with a second mount coupled to the first mount;
a source cable routed through at least part of a vehicle seat;
a power cable at least partially within the interior and coupled to the source cable;
a transmitter carried by the headrest coupled to the power cable, and adapted to wirelessly transmit electrical power;
a receiver capable of receiving a transmission from a device at least when the device is within a field of transmission of the transmitter; and
a switch in electrical communication with the transmitter, wherein the switch is responsive to a signal from the receiver indicating that the device is within the field of transmission such that the switch changes state to selectively permit wireless transmission of electrical power from the transmitter.

15. The assembly of claim 14 wherein the switch is responsive to a signal from the receiver indicating that the device is within the field of transmission and wherein the switch is in a state that prevents the transmitter from providing the wireless power transmission when the device is not indicated to be within the field of transmission.

16. The assembly of claim 14 wherein one of the first mount and the second mount includes an opening, and the other of the first mount and the second mount includes a post at least partially received within the opening, and wherein one or both of the source cable and the power cable extend at least partially through the first mount or the second mount.

17. The assembly of claim 14 wherein the transmitter emits radio waves at a frequency, a magnetic field, or a charging beam capable of inducing an electric potential in the device within a field of transmission.

*     *     *     *     *